W. B. VAN VOORHIS.
Securing Pulleys to Shafts.
No. 139,282.  Patented May 27, 1873.
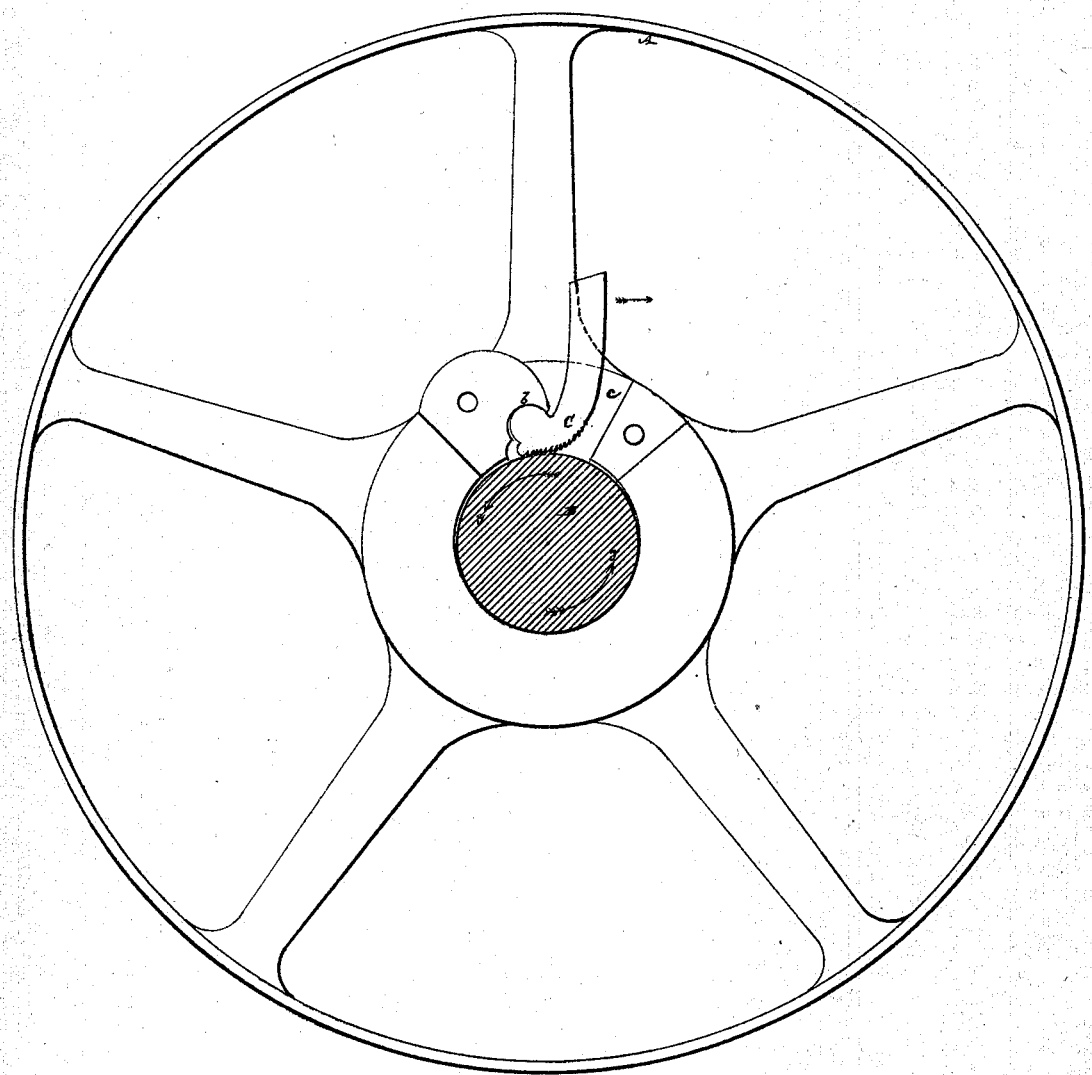
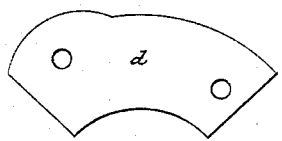

UNITED STATES PATENT OFFICE.

WILLIAM B. VAN VOORHIS, OF NEW YORK, N. Y.

IMPROVEMENT IN SECURING PULLEYS TO SHAFTS.

Specification forming part of Letters Patent No. 139,282, dated May 27, 1873; application filed November 14, 1872.

*To all whom it may concern:*

Be it known that I, WILLIAM B. VAN VOORHIS, of the city, county, and State of New York, have invented an Improved Device for Securing Pulleys and other Attachments to Shafting, of which the following is a specification:

This invention has for its object the simple and rapid attachment and detachment of pulleys, wheels, couplings, and other devices to and from shafting; and consists in a clamping cam-lever arranged to fit loosely within a socket in the hub or corresponding portion of the device to be attached and made to rest upon the shaft, so that the rotation of the latter in a given direction will cause the clamping cam-lever to automatically bite on the shaft, and so that in case of breakage of the clamping device the same can be readily removed. Furthermore said clamping device is so constructed that its hold upon or release from the shaft is capable of being effected by a blow or pressure from the exterior of the article it serves to attach to the shaft.

In the accompanying drawing which forms part of this specification, Figure 1 represents a side view of a pulley arranged upon a shaft and having my invention applied to it, a plate which covers the clamping device being removed. Fig. 2 is a face view of said plate detached.

A is a pulley fitted loosely upon a shaft, B, and having a radial opening, c, through and in one side of its hub to receive within it, when taking off a covering-plate, d, the clamping cam-lever C, which is thus entered endwise within the hub, and is formed with a knuckle at its lower end arranged to enter a socket, b, in the hub, so as to form a bearing or fulcrum for the lever. Said lever projects through the opening c in the hub of the pulley to admit of its adjustment from the exterior, and is ribbed or roughened on its cam portion where it rests upon the shaft. Thus arranged it is only necessary to give the lever a slight tap in the direction indicated by the arrow x, when the rotation of the shaft in direction of the arrows y will cause said shaft to automatically tighten the hold of the cam-lever upon it. To release the gripe of said lever upon the shaft it is only necessary to tap on it in a reverse direction when the pulley will sit loose upon the shaft.

In case of breakage of the clamping cam-lever C or its knuckle in the socket b, it may readily be slipped out endwise from the pulley on removing the covering-plate d and another lever be inserted in its place.

What is here claimed, and desired to be secured by Letters Patent, is—

The clamping cam-lever C arranged to fit loosely within the socket b in the hub or corresponding portion of the device to be attached for automatic hold on the shaft, substantially as specified.

WM. B. VAN VOORHIS.

Witnesses:
  MICHAEL RYAN,
  DAVID MISELL.